US009448426B2

(12) United States Patent
Kono

(10) Patent No.: US 9,448,426 B2
(45) Date of Patent: Sep. 20, 2016

(54) MACH-ZEHNDER MODULATOR

(71) Applicant: SUMITOMO ELECTRIC INDUSTRIES, LTD., Osaka (JP)

(72) Inventor: Naoya Kono, Yokohama (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 14/828,887

(22) Filed: Aug. 18, 2015

(65) Prior Publication Data

US 2016/0054639 A1 Feb. 25, 2016

(30) Foreign Application Priority Data

Aug. 21, 2014 (JP) ................... 2014-168584

(51) Int. Cl.
| | |
|---|---|
| G02F 1/035 | (2006.01) |
| G02F 1/03 | (2006.01) |
| G02F 1/07 | (2006.01) |
| G02F 1/025 | (2006.01) |
| G02F 1/225 | (2006.01) |
| G02F 1/21 | (2006.01) |

(52) U.S. Cl.
CPC ............. *G02F 1/025* (2013.01); *G02F 1/2255* (2013.01); *G02F 1/2257* (2013.01); *G02F 2001/212* (2013.01)

(58) Field of Classification Search
CPC .. G02F 1/1025; G02F 1/2255; G02F 1/2257; G02F 2001/212
USPC .................. 385/1–3; 359/237, 238, 248, 254
See application file for complete search history.

(56) References Cited

U.S. PATENT DOCUMENTS

| | | | |
|---|---|---|---|
| 2010/0232736 A1* | 9/2010 | Ichikawa | G02F 1/0356 385/2 |
| 2013/0209023 A1 | 8/2013 | Prosyk | |
| 2014/0153860 A1* | 6/2014 | Prosyk | G02F 1/2257 385/3 |
| 2014/0248019 A1* | 9/2014 | Witzens | G02F 1/0121 385/2 |

OTHER PUBLICATIONS

"Analysis of a new configuration of coplanar stripline" by McLean et al, IEEE Transactions on Microwave Theory and Technology, vol. 40, No. 4, pp. 772-774, 1992.*

* cited by examiner

*Primary Examiner* — Robert Tavlykaev
(74) *Attorney, Agent, or Firm* — Smith, Gambrell & Russell, LLP.

(57) ABSTRACT

A Mach-Zehnder modulator includes: a conductive semiconductor region disposed on a substrate; a first waveguide arm disposed on the conductive semiconductor region; a second waveguide arm disposed on the conductive semiconductor region; a first electrode disposed on the first waveguide arm, the first electrode receiving a first drive signal applied to the first waveguide arm; a second electrode disposed on the second waveguide arm, the second electrode receiving a second drive signal applied to the second waveguide arm; a first ground electrode disposed on the conductive semiconductor region, the first ground electrode being electrically connected to a reference potential; and a second ground electrode disposed on the conductive semiconductor region. The first and second drive signals constitute a differential signal. The second ground electrode is electrically connected to the first ground electrode via the conductive semiconductor region.

12 Claims, 10 Drawing Sheets

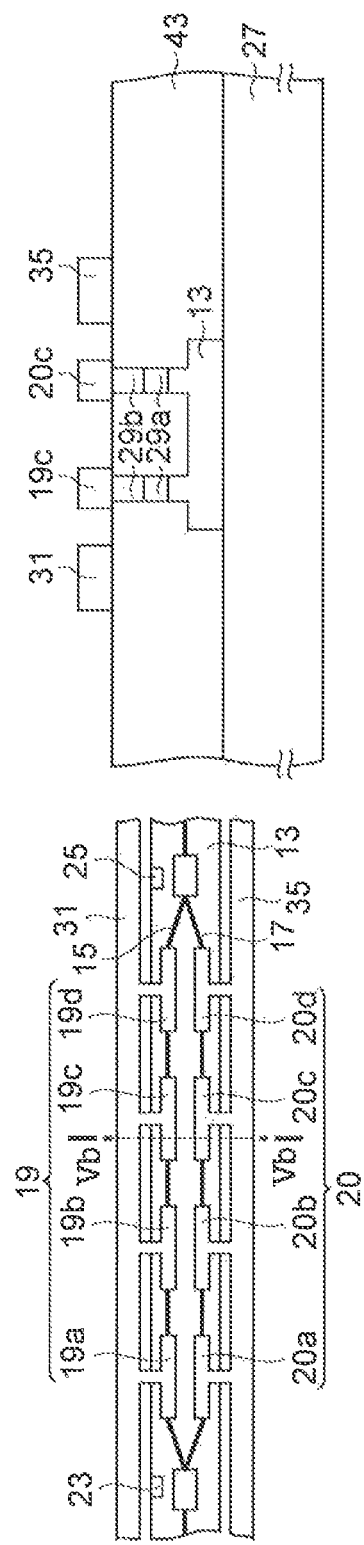
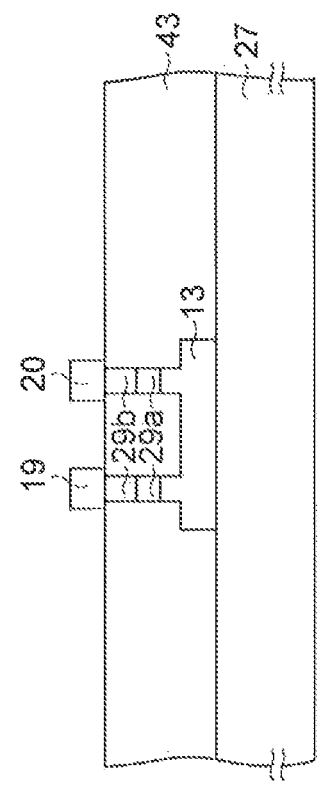
FIG. 5A  FIG. 5B  FIG. 5C  FIG. 5D

MACH-ZEHNDER MODULATOR

BACKGROUND OF THE INVENTION

1. Field of the Invention

The present disclosure relates to a Mach-Zehnder modulator,

2. Description of the Related Art

Patent Literature 1 (U.S. Unexamined Patent Application Publication No. 2013/0209023) discloses a Mach-Zehnder modulator.

The Mach-Zehnder modulator in Patent Literature 1 is driven by a differential driver. In the Mach-Zehnder modulator, a pair of signal electrodes, which allows a pair of differential signals to be transmitted, extends in parallel with one arm waveguide and the other aria waveguide, respectively. A pair of signal electrodes is connected to the upper surface of a P-type layer of the one arm waveguide, and the upper surface of a P-type layer of the other arm waveguide, respectively. An N-type layer of the one arm waveguide and an N-type layer of the other arm waveguide are connected to a common conductive plane provided below. The common conductive plane has a floating potential without being connected to the ground electrode. A pair of ground lines extends in parallel with and outwardly of a pair of signal electrodes, thereby forming a transmission line in GSSG structure.

SUMMARY OF THE INVENTION

With a transmission line in the GSSG structure disclosed in Patent Literature 1, the potential of the outer ground line composed of metal is unstable, thereby degrading the frequency response of the Mach-Zehnder modulator. Periodic drops occur in the degraded frequency response. The unstable potential is caused by an inductance which arises from the parallel arrangement of the ground lines composed of metal and the transmission lines composed of metal.

Also, a differential signal inputted from a driver circuit to a modulator includes not only a differential mode but also a common mode which is noise. The common mode noise is easy to be reflected by a termination resistor and a bonding wire connected to the modulator opposite to the driver circuit. The reflected common mode noise is transmitted through the ground lines of the Mach-Zehnder modulator and is finally returned to the driver circuit. The common mode noise returned to the driver circuit causes the operation of the driver circuit to be unstable. Therefore, in the Mach-Zehnder modulator driven by a differential signal, the reflection of the common mode has to be reduced.

A Mach-Zehnder modulator according to an aspect of the present disclosure includes: a conductive semiconductor region disposed on a principal surface of a substrate, the conductive semiconductor region extending in a direction of a first axis, the conductive semiconductor region having a first conductivity type; a first waveguide arm provided on the conductive semiconductor region, the first waveguide arm extending in the direction of the first axis; a second waveguide arm provided on the conductive semiconductor region, the second waveguide arm extending in the direction of the first axis; a first electrode disposed on the first waveguide arm, the first electrode receiving a first drive signal applied to the first waveguide arm; a second electrode disposed on the second waveguide arm, the second electrode receiving a second drive signal applied to the second waveguide arm; a first ground electrode disposed on the conductive semiconductor region, the first ground electrode being electrically connected to a reference potential; and a second ground electrode disposed on the conductive semiconductor region. The first and second drive signals constitute a differential signal. The second ground electrode is separated from the first ground electrode by a first distance. The second ground electrode is electrically connected to the first ground electrode via the conductive semiconductor region.

The aforementioned objects and other objects, characteristics, and advantages of the present disclosure will be more readily apparent by the following detailed description of a preferred embodiment of the present disclosure with reference to the accompanying drawings.

BRIEF DESCRIPTION OF THE DRAWINGS

FIGS. 5A to 5D are each a diagram illustrating the disposition of an arm waveguide and metal line of the Mach-Zehnder modulator according to the present embodiment.

DESCRIPTION OF THE PREFERRED EMBODIMENTS

Figure 1:
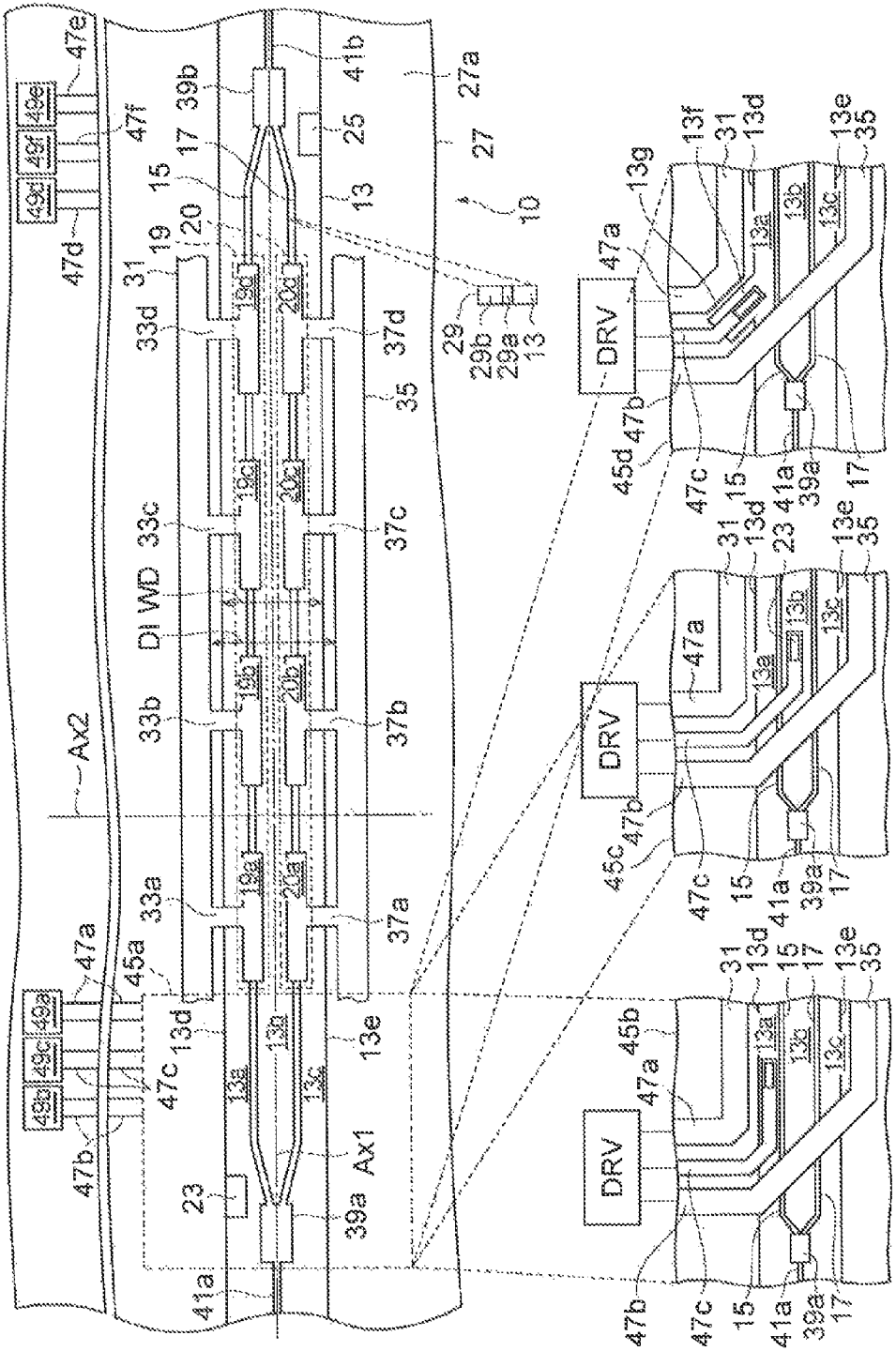
FIG. 1 is a plan view schematically illustrating a Mach-Zehnder modulator according to the present embodiment.

Hereinafter, some specific examples will be described.

A Mach-Zehnder modulator according to an embodiment includes: (a) a conductive semiconductor region disposed on a principal surface of a substrate, the conductive semiconductor region extending in a direction of a first axis, the conductive semiconductor region having a first conductivity type; (b) a first waveguide arm disposed on the conductive semiconductor region, the first waveguide arm extending in the direction of the first axis; (c) a second waveguide arm disposed on the conductive semiconductor region, the second waveguide arm extending in the direction of the first axis; (d) a first electrode disposed on the first waveguide arm, the first electrode receiving a first drive signal which is applied to the first waveguide arm; (e) a second electrode disposed on the second waveguide arm, the second electrode receiving a second drive signal which is applied to the second waveguide arm; (f) a first ground electrode disposed on the conductive semiconductor region, the first ground electrode being electrically connected to a reference potential; and (g) a second ground electrode disposed on the conductive semiconductor region. The first and second drive signals constitute a differential signal. The second ground electrode is electrically connected to the first ground electrode via the conductive semiconductor region.

With the Mach-Zehnder modulator, a differential drive signal is inputted from an input end and is received by the first electrode on the first waveguide arm and the second electrode of the second waveguide arm. The drive signal from a driver circuit includes not only a differential mode signal but also a common mode noise. The drive signal travels in the first and second electrodes from the input end of the Mach-Zehnder modulator to a termination connected to a downstream side of the Mach-Zehnder modulator. In the termination, reflection of a common mode occurs depending on its structure. The reflected common mode travels toward the driver circuit through the Mach-Zehnder modulator. The common mode reflected by the termination transmits through the conductive semiconductor region located between the first ground electrode and the second ground electrode. As the conductive semiconductor region has a resistance, the common mode is attenuated in the conductive semiconductor region. The resistance of the conductive semiconductor region is higher than a resistance of an electrode made of metal. The resistance in the conductive semiconductor region causes the reflected common mode arriving at the driver circuit to be reduced. The reduction of reflected common mode by the conductive semiconductor region protects the driver circuit from operating unstably.

In the Mach-Zehnder modulator according to an embodiment, the first ground electrode is separated from the second ground electrode with a first distance so as to receive a common mode noise passing from the second ground electrode via the conductive semiconductor region. With the Mach-Zehnder modulator, the common mode noise travels in the conductive semiconductor region rather than the first and second electrode.

In the Mach-Zehnder modulator according to an embodiment, the first electrode has a first end and a second end, the second end is separated from the first end with a second distance that is smaller than the first distance between the first ground electrode and the second ground electrode. With the Mach-Zehnder modulator, the common mode noise is surely attenuated in the conductive semiconductor region.

The Mach-Zehnder modulator according to an embodiment, further includes: a first electrode pad disposed on the principal surface of the substrate, the first drive signal being inputted to the first electrode pad from a driver circuit; a second electrode pad disposed on the principal surface of the substrate, the second drive signal being inputted to the second electrode pad from the driver circuit; a third electrode pad disposed on the principal surface of the substrate, the third electrode pad being electrically connected to the reference potential via the driver circuit; a first conductive line connecting the first electrode pad to the first electrode; a second conductive line connecting the second electrode pad to the second electrode; and a third conductive line connecting the third electrode pad to the first ground electrode. The first conductive line is separated from the third conductive line and extends in parallel with the third conductive line, the second conductive line is separated from the third conductive line and extends in parallel with the third conductive line, and the third conductive line is provided between the first conductive line and the second conductive line.

With the Mach-Zehnder modulator, the first conductive line allows the first drive signal of the differential signal from the first electrode pad to transmit to the first electrode. The second conductive line allows the second drive signal of the differential signal from the second electrode pad to transmit to the second electrode. The third conductive line is electrically connected to the reference potential via the third electrode pad and the driver circuit. The reference potential is a constant electrical potential such as a ground potential. The first, second, and third conductive lines constitute a transmission line in SGS structure. The transmission line allows RF microwave differential signals to transmit with low loss. The differential drive signal transmits through the first and second electrodes and reaches the termination. Most of the differential signal is terminated at the termination, but some amount of the common mode is reflected back by the termination. The common mode reflected by the termination transmits through the conductive semiconductor region between the first ground electrode and the second ground electrode. The resistance of the conductive semiconductor region reduces the amplitude of the common mode that is reflected by the termination and is returned to the input end. The reduced common mode arrives at the third electrode pad through the third conductive line.

The Mach-Zehnder modulator according to an embodiment, further includes: a fourth conductive line connected to the first electrode; a fifth conductive line connected to the second electrode; and a termination resistor disposed on the principal surface of the substrate. The termination resistor is connected to the fourth conductive line and the fifth conductive line.

The Mach-Zehnder modulator according to an embodiment, further includes: a first metal line separated from the first waveguide arm, the first metal line extending in the direction of the first axis; a plurality of first bridge metal bodies arranged in the direction of the first axis; a second metal line separated from the second waveguide arm, the second metal line extending in the direction of the first axis; and a plurality of second bridge metal bodies arranged in the direction of the first axis. The first electrode includes a plurality of first electrode bodies arranged in the direction of the first axis. The second electrode includes a plurality of second electrode bodies arranged in the direction of the first axis. The plurality of first bridge metal bodies connects the first metal line to the first electrode bodies, respectively. The plurality of second bridge metal bodies connects the second metal line to the second electrode bodies, respectively. The first metal line, the first waveguide arm, the second waveguide arm, and the second metal line are arranged in a direction of a second axis that intersects the first axis.

With the Mach-Zehnder modulator, the first electrode body of the first electrode is provided separately from the first metal line, and the second electrode body of the second electrode is provided separately from the second metal line. The first metal line is separable from the first waveguide arm and the second metal line is separable from the second waveguide arm.

In the Mach-Zehnder modulator according to an embodiment, the principal surface of the substrate has a first area, a second area, and a third area located between the first area and the second area. The third area extends in the direction of the first axis. The conductive semiconductor region has a stripe shape and extends in the direction of the first axis in the third area. The first metal line extends on the first area, and the second metal line extends on the second area.

With the Mach-Zehnder modulator, the first metal line extends on the first area and the second metal line extends on the second area. Also, the conductive semiconductor region is not provided on the first area and the second area. The conductive semiconductor region has a stripe shape that extends in the direction of the first axis in the third area. For this reason, an undesirable inductive coupling between the first and second metal lines and the conductive semiconductor region is reduced. Therefore, it is possible to avoid the degradation of the transmission characteristics of the differential mode of the Mach-Zehnder modulator The Mach-Zehnder modulator according to an embodiment, further includes: a resin body disposed on the principal surface of the substrate and on the conductive semiconductor region. The first metal line and the second metal line are disposed on the resin body.

In the Mach-Zehnder modulator according to an embodiment, the conductive semiconductor region has an edge and a first portion located between the edge and the first waveguide arm. The edge of the conductive semiconductor region extends in the direction of the first axis. The first ground electrode is in contact with the first portion of the conductive semiconductor region.

In the Mach-Zehnder modulator according to an embodiment, the conductive semiconductor region has an edge, a first portion, and a second portion. The first portion is located between the edge and the first waveguide arm. The second portion is located between the first waveguide arm and the second waveguide arm. The edge of the conductive semiconductor region extends in the direction of the first axis. The first ground electrode is in contact with the second portion of the conductive semiconductor region.

In the Mach-Zehnder modulator according to an embodiment, the conductive semiconductor region has an edge and a first portion located between the first edge and the first waveguide arm. The edge of the conductive semiconductor region extends in the direction of the first axis. The first portion has a protruding portion protruding from the first edge. The first ground electrode is in contact with the protruding portion of the first portion.

In the Mach-Zehnder modulator according to an embodiment, the first waveguide arm includes a first active layer disposed on the conductive semiconductor region, and a first cladding layer disposed on the first active layer. The first cladding layer has a second conductivity type. The second waveguide arm includes a second active layer disposed on the conductive semiconductor region, and a second cladding layer disposed on the second active layer. The second cladding layer has the second conductivity type. The first electrode is in contact with the first cladding layer. The second electrode is in contact with the second cladding layer.

The knowledge of the present disclosure may be readily understood in consideration of the following detailed description with reference to the accompanying drawings provided as examples. Next, an embodiment related to a Mach-Zehnder modulator and an optical modulator including the Mach-Zehnder modulator will be described with reference to the accompanying drawings. If possible, the same component is denoted by the same symbol.

FIG. 1 is a plan view schematically illustrating a Mach-Zehnder modulator according to the present embodiment. A Mach-Zehnder modulator 10 includes a substrate 27. The Mach-Zehnder modulator 10 includes a first conductive type semiconductor region 13 (a conductive semiconductor region) disposed on the substrate 27. The Mach-Zehnder modulator 10 includes a first waveguide arm 15, a second waveguide arm 17, a first electrode 19, a second electrode 20, a first ground electrode 23, and a second ground electrode 25.

The first conductive type semiconductor region 13 has a first conductivity type. The first electrode 19 and the second electrode 20 are composed of metal. The first conductive type semiconductor region 13 has a higher resistance than that of metal. The first waveguide arm 15 and the second waveguide arm 17 are provided on the first conductive type semiconductor region 13. The first and second waveguide arm 15 and 17 extend in a direction of a first axis Ax1. The first conductive type semiconductor region 13 has a stripe shape extending in the direction of the first axis Ax1. The first ground electrode 23 and the second ground electrode 25 are disposed on the first conductive type semiconductor region 13. The second ground electrode 25 is separated from the first ground electrode 23. The second ground electrode 25 is electrically connected to the first ground electrode 23 via the first conductive type semiconductor region 13.

In the Mach-Zehnder modulator 10, the first ground electrode 13 is electrically connected to a reference potential which is a constant electrical potential such as a ground potential. The first electrode 19 is provided on the first waveguide arm 15 and the second electrode 20 is provided on the second waveguide arm 17. The first electrode 19 receives a first drive signal that is applied to the first waveguide arm 15. The second electrode 20 receives a second differential drive signal that is applied to the second waveguide arm 17. The first and second drive signals configure a differential drive signal. The differential drive signal passes through the first and second electrodes 19 and 20, and differentially drives the first waveguide arm 15 and the second waveguide arm 17. The differential drive signal transmits through the first and second electrodes 19 and 20 in an incident direction along the direction of the first axis Ax1. The differential drive signal reaches a termination which is disposed outside of the Mach-Zehnder modulator 10.

When a drive signal from a drive element (for instance, a driver circuit DRV) is applied to the first electrode 19 and the second electrode 20, the drive signal includes not only a differential mode but also a common mode. Most of the differential mode is terminated at the termination, but some amount of the common mode is undesirably reflected back from the termination. The reflected common mode is returned to the driver circuit DRV through the Mach-Zehnder modulator 10. In particular, the reflected common mode arrives at the second ground electrode 25, and transmits through the first conductive type semiconductor region 13 toward the first ground electrode 23. As the first conductive type semiconductor region 13 has a resistance, the amplitude of the reflected common mode is reduced. The inclusion of the resistance in the first conductive type semiconductor region 13 makes it possible to avoid returning the reflected common mode to the driver circuit DRV.

The first waveguide arm 15 and the second waveguide arm 17 each include a semiconductor mesa 29. As illustrated in FIG. 2B, each of the first waveguide arm 15 and the second waveguide arm 17 includes an active layer 29a and an upper cladding layer 29b. The active layer 29a is provided between the upper cladding layer 29b and the first conductive type semiconductor region 13. The upper cladding layer 29b is a semiconductor layer having a second conductivity type different from the first conductivity type. The first waveguide arm 15 and the second waveguide arm 17 include part of the first conductive type semiconductor region 13 as needed.

Figure 2A:
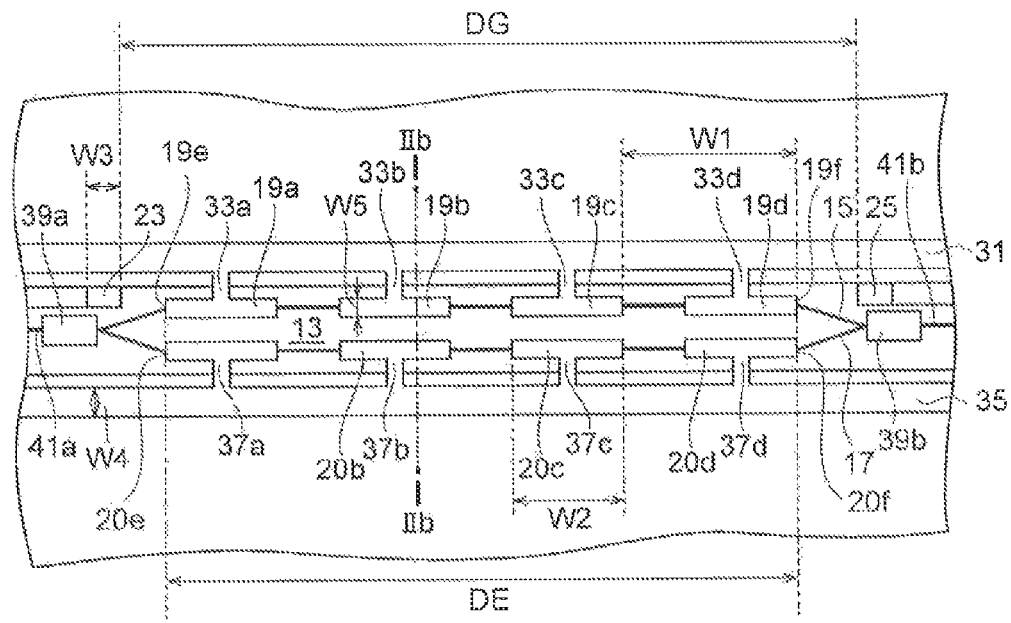
FIGS. 2A and 2B are each a diagram illustrating a structure according to an embodiment of the Mach-Zehnder modulator illustrated in FIG. 1.
Figure 2B:
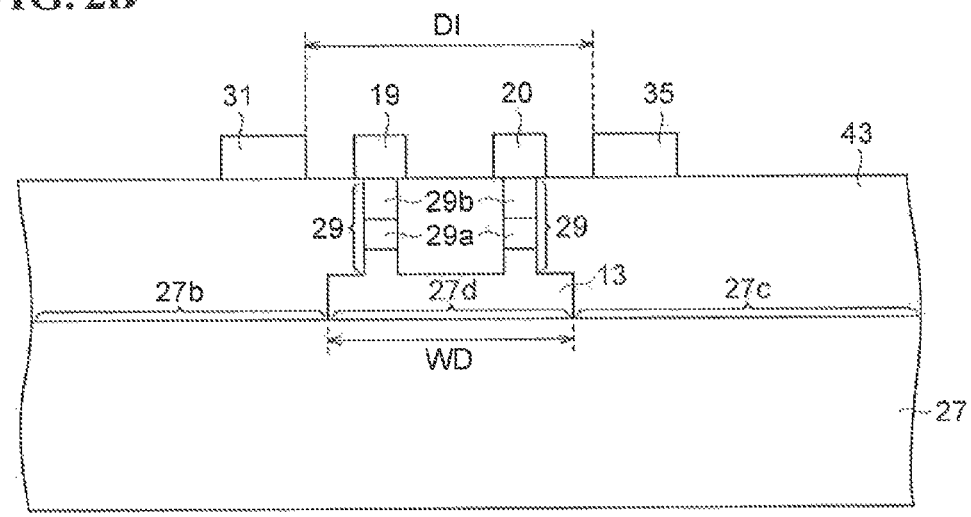

In the Mach-Zehnder modulator 10, as illustrated in FIG. 1 and FIG. 2A, the first electrode 19 includes first electrode bodies 19a, 19b, 19c, 19d that are arranged in the direction of the first axis Ax1. The first electrode bodies 19a to 19d are connected to the upper surface of the first waveguide arm 15. The first electrode 19 has a first end 19e and a second end 19f. The first end 19e and the second end 19f are separated from each other by a distance DE. The second electrode 20 includes second electrode bodies 20a, 20b, 20c, 20d that are arranged in the direction of the first axis Ax1. The second electrode bodies 20a to 20d are connected to the upper surface of the second waveguide arm 17. The second electrode 20 has a third end 20e and a fourth end 20f. The third end 20e and the fourth end 20f are separated from each other by the distance DE.

The Mach-Zehnder modulator 10 includes a first metal line 31 and metal bridges (for instance, first bridge metal bodies 33a, 33b, 33c, and 33d). The first metal line 31 is connected to the first electrode bodies 19a to 19d via the first bridge metal bodies 33a to 33d, respectively. In addition, the Mach-Zehnder modulator 10 includes a second metal line 35 and metal bridges (for instance, second bridge metal bodies 37a, 37b, 37e, and 37d). The second metal line 35 is connected to the second electrode bodies 20a to 20d via the second bridge metal bodies 37a to 37d, respectively. The first metal line 31, the first waveguide arm 15, the second waveguide arm 17, and the second metal line 35 are arranged in the direction of a second axis Ax1 that intersects the first axis Ax1.

In the Mach-Zehnder modulator 10, the first electrode bodies 19a to 19d of the first electrode 19 are provided separately from the first metal line 31, and the second electrode bodies 20a to 20d of the second electrode 20 are provided separately from the second metal line 35. The first metal line 31 is separable from the first waveguide arm 15, and the second metal line 35 is separable from the second waveguide arm 17.

The Mach-Zehnder modulator 10 includes a first MMI coupler 39a and a second MMI coupler 39b. One end of the first waveguide arm 15 and one end of the second waveguide arm 17 are connected to the first MMI coupler 39a, and the other end of the first waveguide arm 15 and the other end of the second waveguide arm 17 are connected to the second MMI coupler 39b. The Mach-Zehnder modulator 10 includes a first waveguide 41a and a second waveguide 41b related to optical input/output. The first waveguide 41a is optically coupled to the first waveguide arm 15 and the second waveguide arm 17 via the first MMI coupler 39a. The second waveguide 41b is optically coupled to the first waveguide arm 15 and the second waveguide arm 17 via the second MMI coupler 39b.

FIG. 1 illustrates a connection structure 45a of the ground electrode. In an embodiment of the connection structure 45a, the first ground electrode 23 is provided adjacent to the first MMI coupler 39a or the first waveguide 41a, and the second ground electrode 25 is provided adjacent to the second MMI coupler 39b or the second waveguide 41b. The second ground electrode 25 is separated from the first ground electrode 23 by a distance DG. The distance DE between the first and second ends 19e and 19f of the first electrode 19 is smaller than the distance DO between the first and second ground electrodes 23 and 25.

The Mach-Zehnder modulator 10 includes a first conductive line 47a, a second conductive line 47b, a third conductive line 47c, a first electrode pad 49a, a second electrode pad 49b, and a third electrode pad 49c. The electrode pads 49a, 49b and 49c are disposed on the substrate 27. The first electrode pad 49a is connected to one end of the first metal line 31 (the first electrode 19) via the first conductive line 47a. The second electrode pad 49b is connected to one end of the second metal line 35 (the second electrode 20) via the second conductive line 47b. The third electrode pad 49c is connected to the first ground electrode 23 via the third conductive line 47c. The first conductive line 47a is separated from the third conductive line 47c and extends in parallel with the third conductive line 47c. The second conductive line 47b is separated from the third conductive line 47c and extends in parallel with the third conductive line 47c. The third conductive line 47c is provided between the first conductive line 47a and the second conductive line 47b.

In the Mach-Zehnder modulator 10, the first conductive line 47a allows the one differential drive signal from the first electrode pad 49a to transmit to the first electrode 19. The second conductive line 47b allows the other differential drive signal from the second electrode pad 49b to transmit to the second electrode 20. The first conductive line 47a, the second conductive line 47b, and the third conductive line 47c constitute a transmission line in the S-G-S structure. The transmission line allows RF microwave differential signals to transmit with low loss. In the Mach-Zehnder modulator 10, the common mode reflected by the termination transmits through the first conductive type semiconductor region 13 between the first ground electrode 23 and the second ground electrode 25. The first conductive type semiconductor region 13 is non-metallic, and has a resistance higher than that of metal. The resistance of the first conductive type semiconductor region 13 reduces the amplitude of the common mode that is reflected by the termination. The attenuated common mode is returned to the input end. The attenuated common mode arrives at the third electrode pad 49c via the third conductive line 47c.

In the Mach-Zehnder modulator 10, the first conductive type semiconductor region 13 is divided by the first waveguide arm 15 and the second waveguide arm 17 into three portions, for instance, a first portion 13a, a second portion 13b, and a third portion 13c. The second portion 13b is located between the first portion 13a and the third portion 13c. The first portion 13a is located between the bottom edge of the first waveguide arm 15 and one edge 13d of the first conductive type semiconductor region 13. The third portion 13c is located between the bottom edge of the second waveguide arm 17 and the other edge 13e of the first conductive type semiconductor region 13. The second portion 13b is located between the bottom edge of the first waveguide arm 15 and the bottom edge of the second waveguide arm 17. The second portion 13b terminates at a location where the first waveguide arm 15 and the second waveguide arm 17 are merged. The first portion 13a, the second portion 13b, and the third portion 13c extend in the direction of the first axis Ax1. The first ground electrode 23 is connected to the first portion 13a of the first conductive type semiconductor region 13, for instance. The second ground electrode 25 is connected to the first portion 13a (as illustrated in FIG. 2A) or the third portion 13c (as illustrated in FIG. 1) of the first conductive type semiconductor region 13, for instance.

The Mach-Zehnder modulator 10 includes a fourth conductive line 47d, a fifth conductive line 47e, a sixth conductive line 47f, a fourth electrode pad 49d, a fifth electrode pad 49e, and a sixth electrode pad 49f. The fourth electrode pad 49d is connected to the other end of the first metal line 31 (the first electrode 19) via the fourth conductive line 47d. The fifth electrode pad 49e is connected to the other end of the second metal line 35 (the second electrode 20) via the fifth conductive line 47e. The sixth electrode pad 49f is connected to the second ground electrode 25 via the sixth conductive line 47f. The fourth conductive line 47d is separated from the sixth conductive line 47f, and extends in parallel with the sixth conductive line 47f. The fifth conductive line 47e is separated from the sixth conductive line 47f and extends in parallel with the sixth conductive line 47f. The sixth conductive line 47f is provided between the fourth conductive line 47d and the fifth conductive line 47e.

In an embodiment, the first electrode pad 49a, the second electrode pad 49b, and the third electrode pad 49c each receive a differential signal from the driver circuit DRV. The fourth electrode pad 49d, the fifth electrode pad 49e, and the sixth electrode pad 49f are connectable to a termination resistor to terminate the differential signal.

The Mach-Zehnder modulator 10 may further include a termination resistor provided on the substrate 27 without including the fourth electrode pad 49d and the fifth electrode pad 49e as needed. The termination resistor is connected between the fourth conductive line 47d and the fifth conductive line 47e.

FIGS. 2A and 2B are each a diagram illustrating a structure according to an embodiment of the Mach-Zehnder modulator illustrated in FIG. 1. FIG. 2A is a plan view illustrating the structure according to the embodiment of the Mach-Zehnder modulator illustrated in FIG. 1. FIG. 2B illustrates a sectional view taken along line IIb-IIb illustrated in FIG. 2A. A principal surface 27a of the substrate 27 has a first area 27b, a second area 27c, and a third area 27d. The third area 27d is located between the first area 27b and the second area 27c. The third area 27d extends in the direction of the first axis Ax1. The first conductive type semiconductor region 13 extends in the direction of the first axis Ax1 on the principal surface 27a of the substrate 27. The first conductive type semiconductor region 13 has a stripe shape. The first conductive type semiconductor region 13 is not in the first area 27b and the second area 27c but extends in the direction of the first axis Ax1 in the third area 27d. The first metal line 31 extends on the first area 27b and the second metal line 35 extends on the second area 27c. In the Mach-Zehnder modulator 10, the first waveguide arm 15, the second waveguide arm 17, the first MMI coupler 39a, the second MMI coupler 39b, the first waveguide 41a, and the second waveguide 41b are embedded in an embedding region 43.

In the Mach-Zehnder modulator 10, the first metal line 31 extends on the first area 27b and the second metal line 35 extends on the second area 27c. The first conductive type semiconductor region 13 on the third area 27d has a stripe shape that extends in the direction of the first axis Ax1. As the embedding region 43 is disposed between the first metal line 31 and the first conductive type semiconductor region 13, the embedding region 43 helps to keep a distance between the first metal line 31 and first conductive type semiconductor region 13 large. Also, the embedding region 43 helps to keep a distance between the second metal line 33 and first conductive type semiconductor region 13 large. the For this reason, undesirable inductive couplings between the first and second metal lines 31, 35 and the first conductive type semiconductor region 13 are suppressed. Therefore, it is possible to avoid the reduction of the transmission characteristics of the differential mode of the Mach-Zehnder modulator 10. A distance DI between the first metal line 31 and the second metal line 35 is greater than a stripe width WD of the first conductive type semiconductor region 13.

As illustrate in FIG. 2A, the first and second electrode bodies are arranged at an interval of W1. Each of the first electrode bodies and the second bodies has a width of W2 in the direction of the first axis Ax1. The first ground electrode 23 and the second ground electrode have a width of W3. The first and second metal lines 31 and 35 have a width of W4. Each of the first electrode bodies and the second bodies has a width of W5 in the direction of the second axis Ax2.

An example of a semiconductor device.
The substrate 27: semi-insulating InP substrate.
The first conductive type semiconductor region 13: Si doped n-type InP, a thickness of 1.0 micrometer, and Si doped n-type InP region in a mesa portion having a thickness of 0.5 micrometers.
The active layer 29a: the multi-quantum well structure of AlGaInAs-based semiconductor, a thickness of 0.5 micrometers.
The upper cladding layer 29b: Zn doped p-type InP, a thickness of 1.0 micrometer.
The embedding region 43: Bisbenzocyclobutene (BCB) resin,
The electrode (19, 20, 31, 35): Au, a thickness of 5 micrometers.
The interval W1: 250 micrometers.
The width W2: 125 micrometers.
The width W3: 50 micrometers.
The width W4: 100 micrometers.
The width W5: 5 micrometers.

Referring to FIG. 1 again, the connection structure for the ground electrode may have other structures without being limited to the connection structure 45a.

A connection structure 45b for the ground electrode will be described. In the connection structure 45b, the first ground electrode 23 is connected to, for instance, the first portion 13a of the first conductive type semiconductor region 13. In this structure, the ground electrode is connected to the first conductive type semiconductor region 13, outside the region surrounded by the first waveguide arm and the second waveguide arm. Since the ground electrode is not provided within the two waveguide arms, the distance between the first waveguide arm 15 and the second waveguide arm 17 may be narrowed. The second ground electrode 25 is connectable, for instance, to the first portion 13a of the first conductive type semiconductor region 13.

A connection structure 45c for the ground electrode will be described. In the connection structure 45c, the first ground electrode 23 and the second ground electrode 25 are connected to the second portion 13b of the first conductive type semiconductor region 13. In this structure, the width of the first portion 13a between the first waveguide arm 15 and the one edge of the first conductive type semiconductor region 13 may be narrow. In addition, it is not needed to increase the width of the third portion 13c between the second waveguide arm 17 and the other edge of the first conductive type semiconductor region 13 in order to provide the ground electrode.

A connection structure 45d for the ground electrode will be described. In the connection structure 45d, the first portion 13a of the first conductive type semiconductor region 13 is provided with an protruding portion 13f. The protruding portion 13f projects outwardly from the one edge 13d or the other edge 13e that extends in the direction of the first axis Ax1. The first ground electrode 23 is connected to the first conductive type semiconductor region 13 in the protruding portion 13f. An outer edge 13g of the protruding portion 13f forms an obtuse angle with respect to the one edge 13d. The metal line from the first ground electrode 23 extends in the direction of an axis that forms an obtuse angle with respect to the first axis Ax1. The metal line is located between the first metal line 31 and the second metal line 35. Adding the protruding portion 13f to the first conductive type semiconductor region 13 in a stripe shape causes an additional electrical resistance. However, in the Mach-Zehnder modulator 10 according to the present embodiment, the resistance of the first conductive type semiconductor region 13 is provided between the ground electrodes, and thus the protruding portion 13f, which causes an additional electrical resistance, is allowed to be provided. In this structure, it is not needed to increase the distance between the first waveguide arm 15 and the second waveguide arm 17 over the entire first conductive type semiconductor region 13 in order to provide the ground electrode. Also, in the structure, it is not needed to increase the width of the first portion 13a and the third portion 13c over the entire first conductive type semiconductor region 13 in order to provide the ground electrode.

Figure 3:
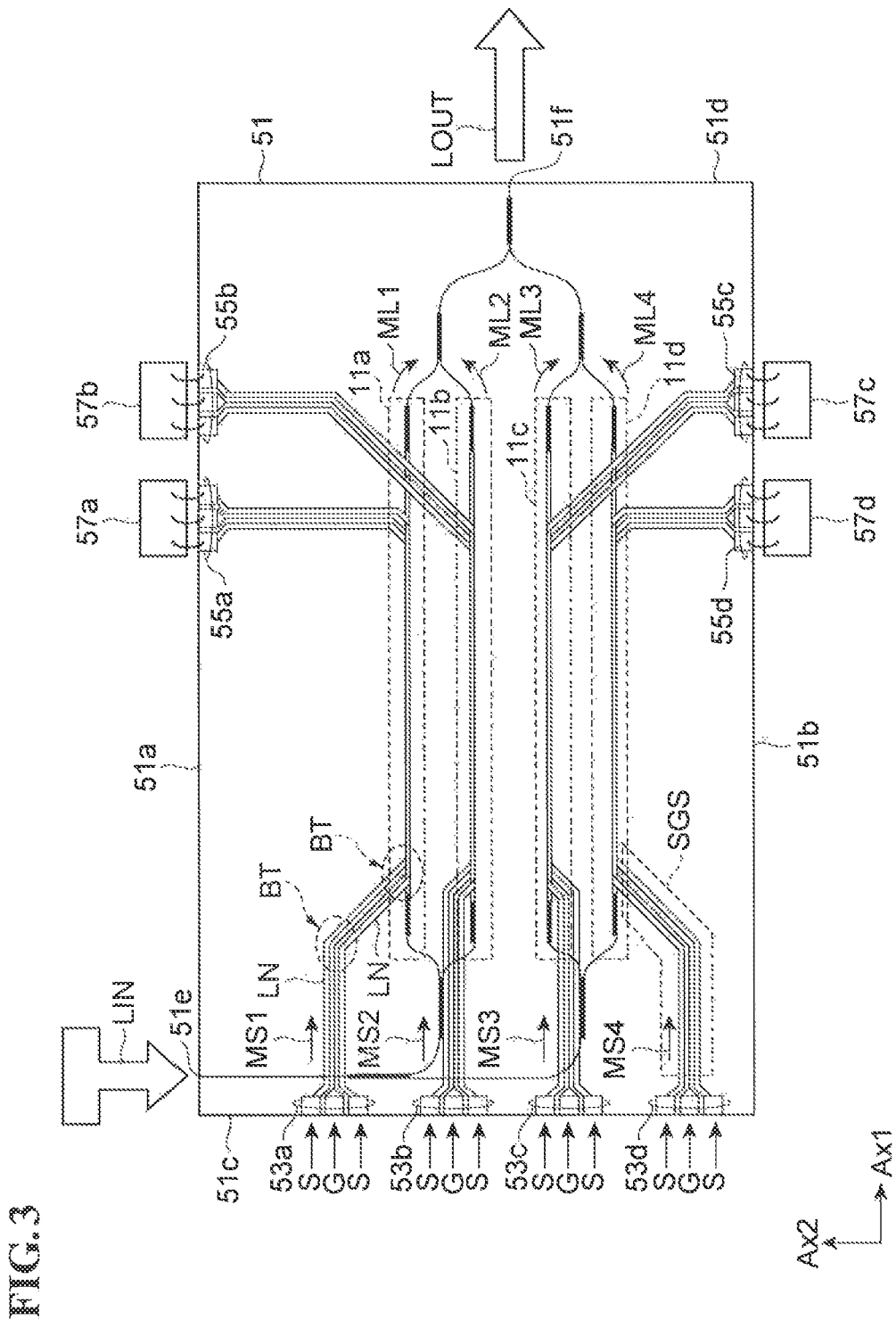
FIG. 3 is a diagram schematically illustrating an optical integrated element including the Mach-Zehnder modulator according to the present embodiment.

FIG. 3 is a diagram schematically illustrating an optical integrated element including the Mach-Zehnder modulator according to the present embodiment. The optical integrated element 51 in the embodiment includes four Mach-Zehnder modulators 11a to 11d. Each of the Mach-Zehnder modulators 11a to 11d may have substantially the same structure as that of the Mach-Zehnder modulator 10.

The optical integrated element 51 includes a first edge 51a and a second edge 51b that extend in the direction of the first axis Ax1, and a third edge 51c and a fourth edge 51d that extend in the direction of the second axis Ax2. In the present embodiment, the first edge 51a is provided with an input port 51e that receives light to be modulated, and the fourth edge 51d is provided with an output port 51f that sends modulated light. Input light LIN from the input port 51e arrives at each of the Mach-Zehnder modulators 11a to 11d via an optical coupler. In the third edge 51c, pads 53a to 53d that respectively receive electrical signals MS1 to MS4 for optical modulation are located. The electrical signals MS1 to MS4 are transmitted from the respective pads 53a to 53d to one ends of electrodes of the Mach-Zehnder modulators 11a to 11d via metal line group SGS in the S-G-S structure. In the present embodiment, the metal line group SGS includes one or plural straight line portions LNs and bent portions BTs that connect the straight line portions LNs. In many optical integrated elements, a metal line, which transmits a modulation signal to the Mach-Zehnder modulator, is inevitably bent. Each bent portion BT may increase the common mode in the modulation signal by reflection of an electrical signal at the portion. The Mach-Zehnder modulators 11a to 11d modulate the light from the input port 51e according to the electrical signals MS1 to MS4, and generate optical signals ML1 to ML4, respectively. The optical signals ML1 to ML4 are each multiplexed via an optical coupler and arrives at the output port 51f. Output light LOUT is provided from the output port 51f. Pads 55a to 55d, which are connected to the termination resistor, are located at the first edge 51a and the second edge 51b. The pads 55a to 55d are connected to termination resistors 57a to 57d, respectively. A bonding wire is used for the connection in the present embodiment.

Figure 4:
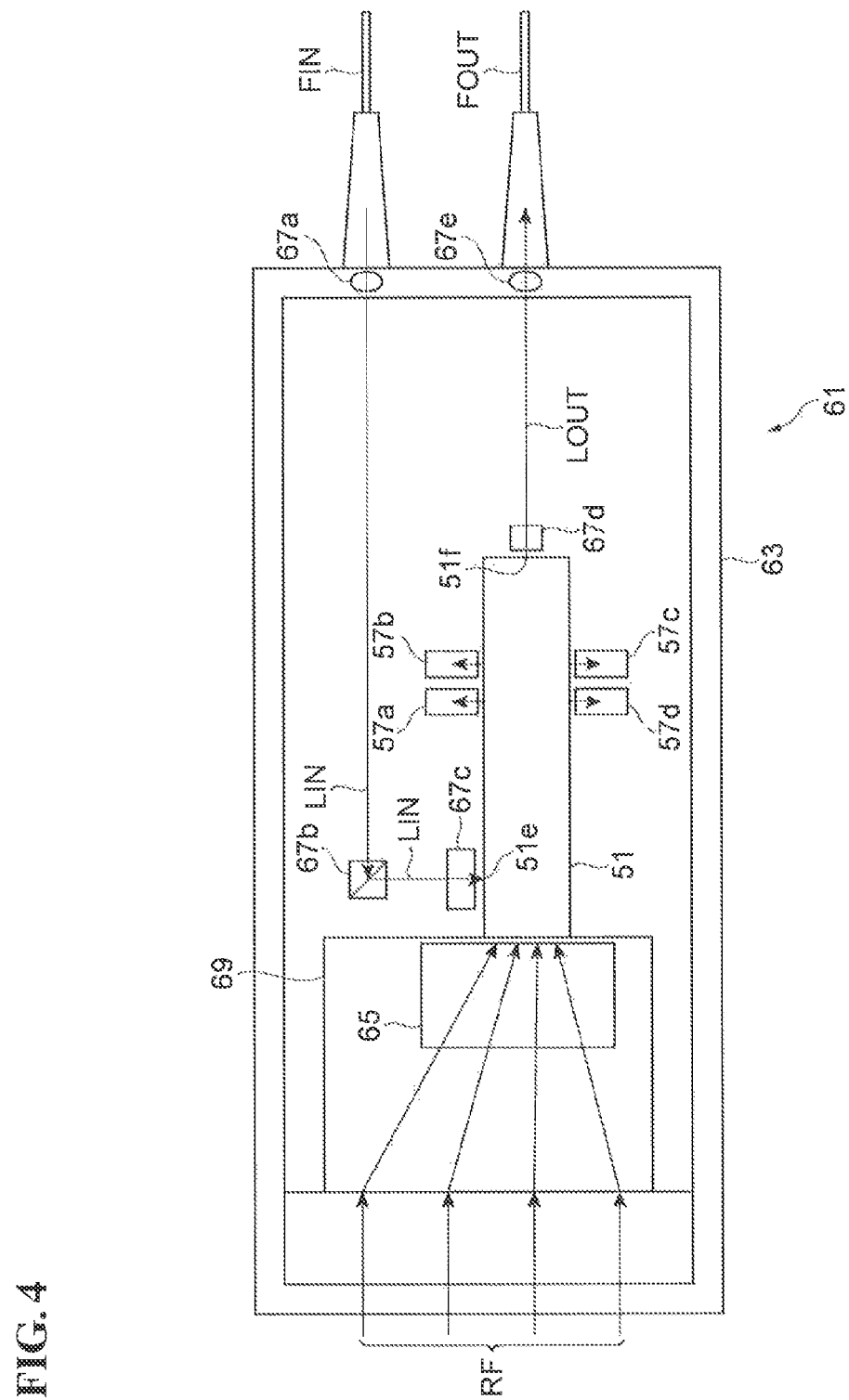
FIG. 4 is a diagram schematically illustrating an optical communication module including the Mach-Zehnder modulator according to the present embodiment.

FIG. 4 is a diagram schematically illustrating an optical communication module including the Mach-Zehnder modulator according to the present embodiment. An optical communication module 61 includes an optical integrated element 51 having one or plural Mach-Zehnder modulators, a housing 63 that houses the optical integrated element 51, and a driver circuit 65. The housing 63 is connected to an input optical fiber FIN and an output optical fiber POUT. The input optical fiber FIN (input light LIN) is coupled to the input port 51e via a collimating lens 67a, a mirror 67b, and a collimating lens 67c. The output port 51f (output light LOUT) is coupled to the output optical fiber POUT via a collimating lens 67d and a collimating lens 67e. The housing 63 receives RE input signal. An RF input signal RF is applied to the optical integrated element 51 via the driver circuit 65 on a relay hoard 69.

FIGS. 5i to 5D are each a diagram illustrating the disposition of an arm waveguide and metal line of the Mach-Zehnder modulator according to the present embodiment. FIGS. 5B and 5D are sectional views of FIGS. 5A and 5C. The first electrode 19 is an extension of the first waveguide arm 15 and serves as the first metal line via which the one differential drive signal is applied to the first waveguide arm 15, The second electrode 20 is an extension of the second waveguide arm 17 and serves as the second metal line via which the other differential drive signal is applied to the second waveguide arm 17. Similarly to FIGS. 5A and 5B, in the Mach-Zehnder modulator illustrated in FIGS. 5C and 5D, the first ground electrode 23 is connected to the first conductive type semiconductor region 13 at one end of the Mach-Zehnder modulator, and the second ground electrode 25 is connected to the first conductive type semiconductor region 13 at the other end of the Mach-Zehnder modulator.

Next, the technical significance of differential drive will be described. The Mach-Zehnder type optical modulator (MZM) has a configuration in which two optical waveguides form a pair, Systems that drive the optical waveguides includes single phase drive and differential drive. In the single phase drive, a modulated electrical signal is applied to only one of the pair of optical waveguides. The modulator illustrated in FIG. 2 in Patent Literature 1 is driven with a single-phase. In the differential drive, electrical signals having mutually reversed phases are applied to both of the pair of optical waveguides. The modulator illustrated in FIGS. 6, 7 and 8 in Patent Literature 1 is differentially driven. In the differential drive, the common mode in the drive signal causes degradation of the optical signal outputted from the modulator. In addition to occurrence in the driver circuit itself, the common mode occurs in a relay board between the driver circuit and the modulator and further occurs in a wire bent portion of a signal transmission line on the optical integrated element. This is because geometric symmetry of a transmission line is broken at a wire bent portion, the transmission line being formed by a set of wires through which signals having reversed phases are transmitted.

Figure 6A:
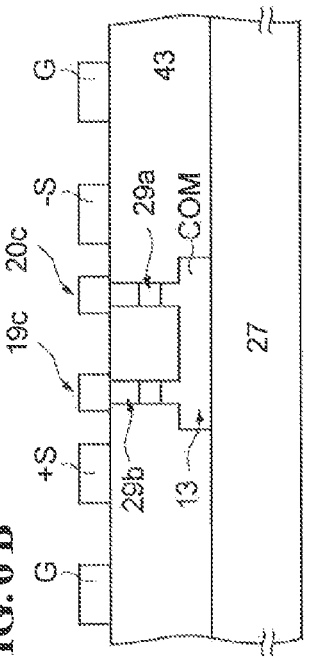
FIGS. 6A to 6D are diagrams illustrating the structure, equivalent circuit, and characteristics of a modulator having a GSSG structure.
Figure 6C:
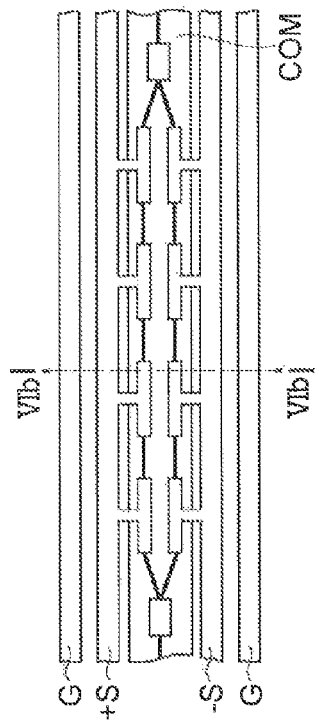
Figure 6B:
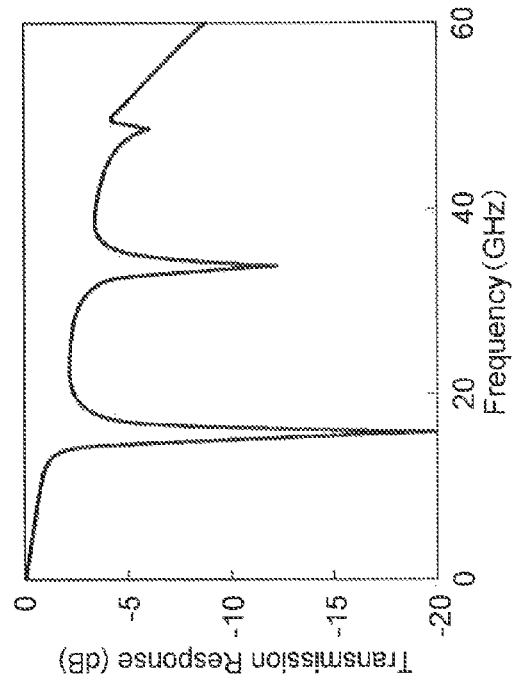
Figure 6D:
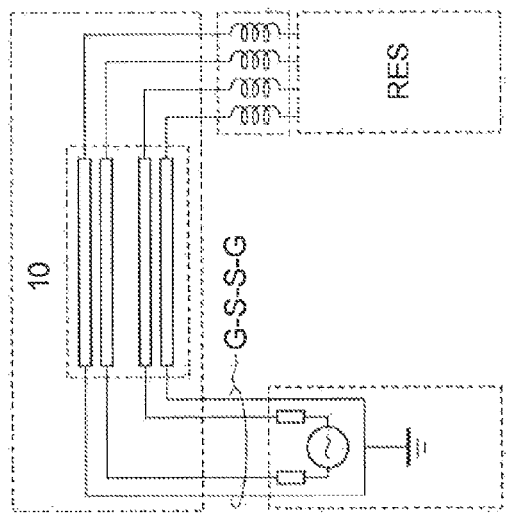

FIGS. 6A to 6D are diagrams illustrating the structure, equivalent circuit, and characteristics of the modulator described in Patent Literature 1, FIG. 6A is a plan view schematically illustrating the modulator described in Patent Literature 1, As illustrated in FIG. 6A, a pair of arm waveguides is driven by a pair of signal lines (+S, −S). A pair of ground lines (G, G) extends in parallel with and outwardly of the signal lines (+S, −S). A metal line is not connected to a conductive semiconductor layer COM which is common in two arm waveguides and which connects them, FIG. 6B illustrates a sectional view taken along line VIb-VIb of FIG. 6A. In the sectional view of the modulator, the arrangement of the signal lines and the ground lines has the GSSG structure. FIG. 6C is a diagram illustrating the equivalent circuit of the modulator described in Patent Literature 1. The equivalent circuit is created by the inventor. The inventor obtained the transmission characteristics of an electrical signal by simulation using the equivalent circuit. FIG. 6D illustrates the transmission characteristics of the electrical signal. In the frequency response of the transmission characteristics of the electrical signal, periodic drops are observed. Such a tendency is also observed in the frequency response of an optical signal.

Figure 10:
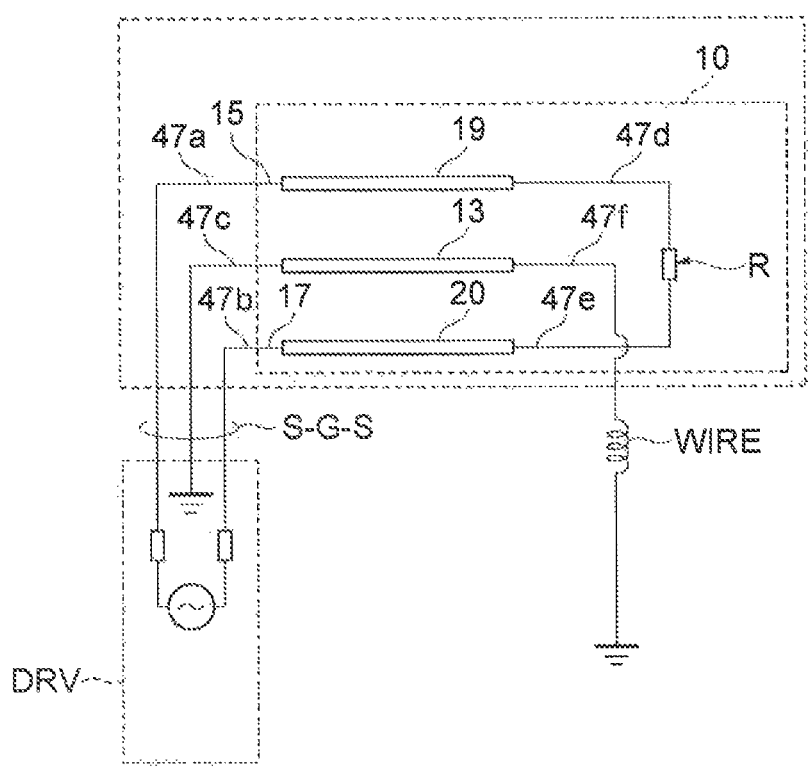
FIG. 10 is a diagram illustrating a termination structure for the Mach-Zehnder modulator according to the present embodiment.

A method of measuring the transmission characteristics of a differential mode in an electrical signal will be described. The right end and the left end of the GSSG differential transmission line of a modulator chip are touched with respective RF microwave probes compatible with the GSSG structure. Characteristics Sdd21 are then measured using a vector network analyzer, the characteristics Sdd21 being the transmission characteristics of a small signal between the two RE microwave probes. Here, the transmission characteristics is the difference between the voltage amplitude of an RF microwave signal which is inputted to the chip from one of the RF microwave probes and the voltage amplitude of an RE microwave signal which is outputted from the other of the RE microwave probes. FIG. 6D illustrates the characteristics Sdd21 obtained by a simulation, the horizontal axis indicates the frequency of an RF microwave signal, and the vertical axis indicates the transmission characteristics of the RF microwave signal. In FIG. 6D, the drops corresponding to FIG. 10 in Patent Literature 1 are observed. Such a frequency characteristic causes a negative factor in transmission quality, and thus not preferable. According to the analysis by the inventor, this adverse characteristic is caused by instability of the potential of the outer ground electrode having a width of approximately 100 micrometers.

When a modulator driven by differential drive includes the ground line made of metal like the modulator in Patent Literature 1, the common mode (reflected wave), which is reflected by the termination of the modulator, transmits through the ground line almost without being attenuated and arrives at the driver circuit. The reflected wave may cause the operation of the driver circuit to be unstable and may cause the waveform of signals from the driver circuit to be degraded.

In order to avoid the signal degradation, the reflected wave of the common mode from the termination resistor of the modulator has to be sufficiently weakened. According to the study of the inventor, for this purpose, it is effective to adopt a termination structure having a resistance equivalent to the characteristic impedance of the common mode. The characteristic impedance of the common mode is increased to a value higher than 25 ohms by the connection between differential lines. In addition, it is preferable to have a sufficiently large area to achieve a stable potential. When a termination structure like the equivalent circuit of FIG. 6C is used, a differential mode and a common mode having mutually different characteristic impedances may be terminated simultaneously. However, this structure is complicated and accompanied by problems such as a high level of difficulty, an increase in the number of components, and a load of assembling (increase in the number of wires for connection).

Figure 7A:
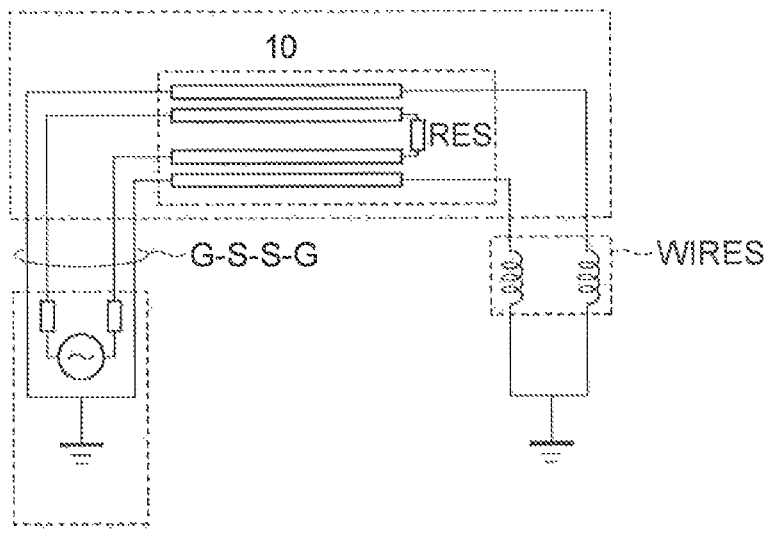
FIGS. 7A to 7C are diagrams illustrating a termination structure, transmission loss characteristics and reflection characteristics of a common mode of a modulator having a GSSG structure.
Figure 7B:
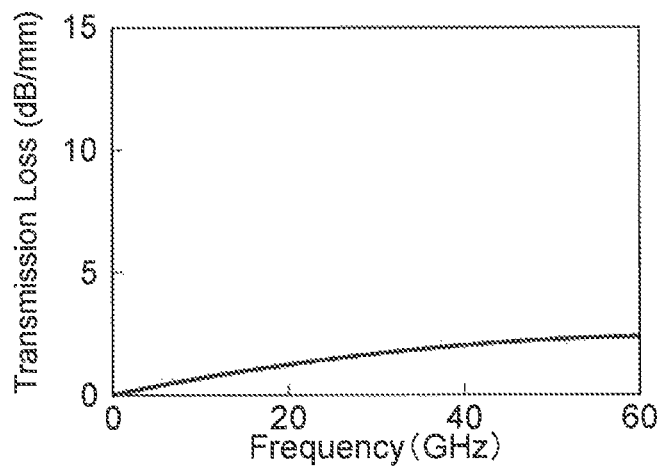
Figure 7C:
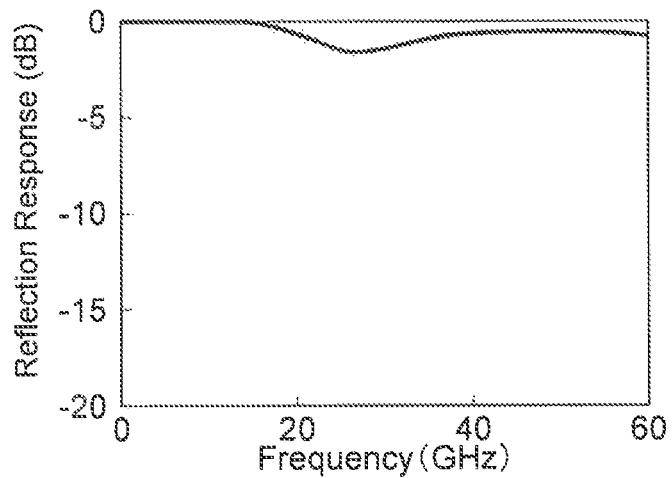

FIGS. 7A to 7C illustrate a simplified termination structure, transmission loss characteristics and reflection characteristics of a common mode. Referring to FIG. 7A, a simplified termination structure is illustrated. In this structure, signal lines (S-S) are connected by a thin film resistance on the modulator chip. In the termination, only the differential mode is properly terminated and the common mode is open at the termination side. In this configuration, a termination resistor chip is not needed and individual ground lines are connected via a single wire. This assembly is relatively easy, however, is limited in terms of characteristics. FIGS. 7B and 7C illustrate the transmission loss characteristics and reflection characteristics of a common mode. These characteristics are obtained by a model created by the inventor and a simulation using the model. When the transmission loss characteristics in a common mode is actually measured, the right end and the left end of the GSSG differential transmission line in the modulator chip are touched with respective RF microwave probes and transmission characteristics Scc21 of a small signal between the probes are measured. When the reflection characteristics of a common mode is measured, the left end of the GSSG differential transmission line in the modulator chip are touched with respective RF microwave probes and the reflection characteristics Scc11 of a small signal between the probes are measured. Unlike the differential mode illustrated in FIG. 7C, no periodic drops are observed in the common mode. Since the transmission loss of the common mode is low, the reflected wave from the termination is returned to the input side almost without being attenuated. For this reason, the reflectance illustrated in FIG. 7C is high.

The inventor studied how to solve the problems in the equivalent circuits as illustrated in FIGS. 6 and 7. In the study, the inventor obtained the finding that only the transmission loss of the common mode is increased without increasing the transmission loss of the differential mode that transmits a signal. Increase of the transmission loss in the common mode reduces returning reflected wave that reaches the driver circuit, regardless of the magnitude of the reflected wave from the termination. To achieve a structure that allows the transmission loss of only the common mode to be increased primarily, a return path of the common mode is identified.

Figure 8:
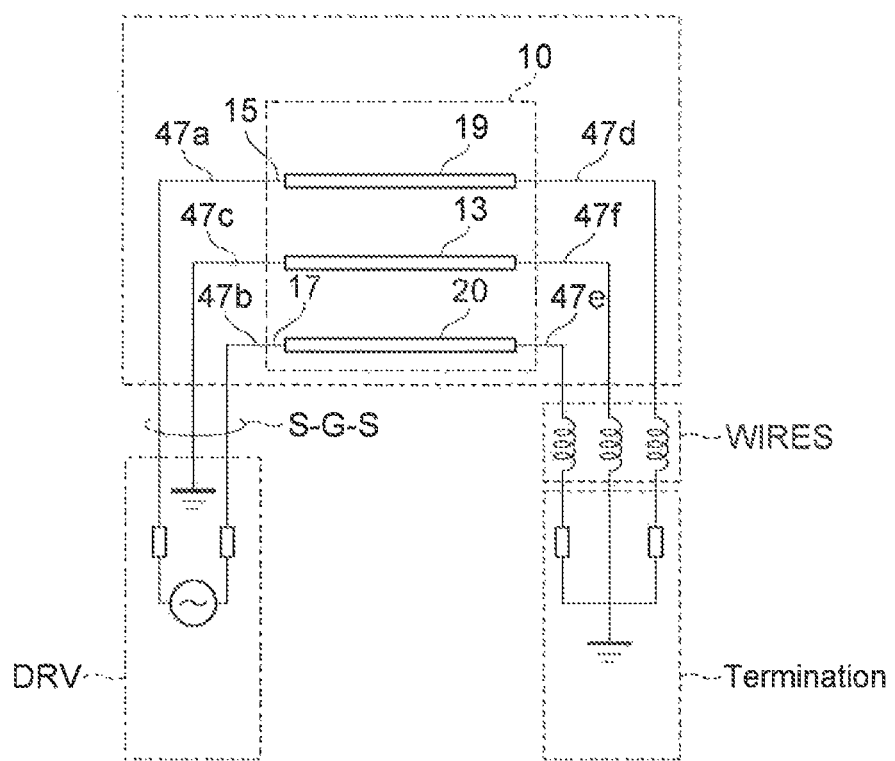
FIG. 8 is a diagram illustrating an equivalent circuit for an embodiment of the optical communication device including the Mach-Zehnder modulator.

Based on such finding, a structure of the Mach-Zehnder modulator according to the present embodiment is implemented. In this structure, a conductor (n-type semiconductor or p-type semiconductor) with a higher resistivity compared with metal is applied to the return path of the common mode, and the outer metal ground line, which may have an unstable potential, is not used. FIG. 8 is a diagram illustrating an equivalent circuit according to some embodiments of the optical communication device including the Mach-Zehnder modulator. Referring to FIG. 8, an equivalent circuit according to the embodiments of the optical communication device is illustrated. In the equivalent circuit, the reference symbols of FIG. 1 are used to facilitate the understanding and detailed illustration of the Mach-Zehnder modulator is omitted to avoid complicated illustration as needed.

Figure 9A:
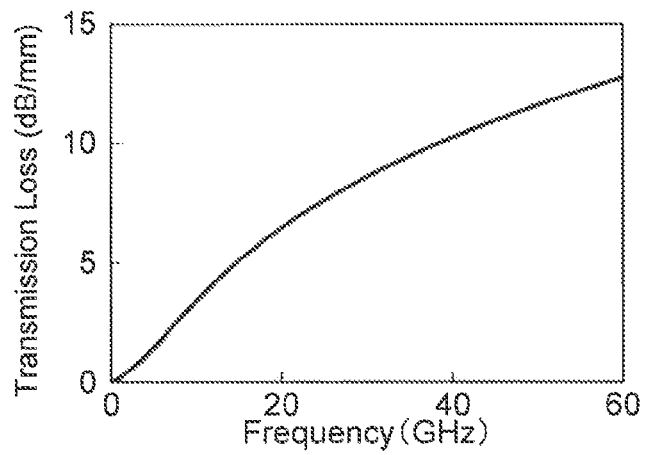
FIGS. 9A to 9C are each a diagram illustrating transmission characteristics according to the embodiment illustrated in FIG. 8.
Figure 9B:
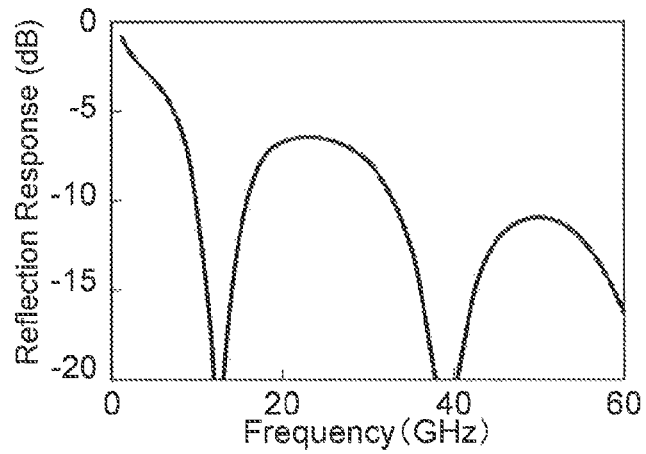

FIGS. 9A and 9B each illustrate the transmission characteristics and reflection characteristics in a simulation which was performed by the inventor using the equivalent circuit illustrated in FIG. 8 as a basic model. In the model illustrated in FIG. 8, a termination is not provided r on the modulator chip. The termination which includes termination resistors and a grounded line is assembled with the modulator chip using bonding wires. The wire WIRES that connects the modulator chip to the termination causes an additional parasitic inductance. The Mach-Zehnder modulator has the SGS structure. In the transmission characteristics of FIG. 9A, the loss gradually increases as a signal applied from a signal source (driver circuit DRV) is increased in frequency. In the reflection characteristics of FIG. 9B, the reflection generally tends to be lower as a signal applied from a signal source (driver circuit DRV) is increased in frequency.

Figure 9C:
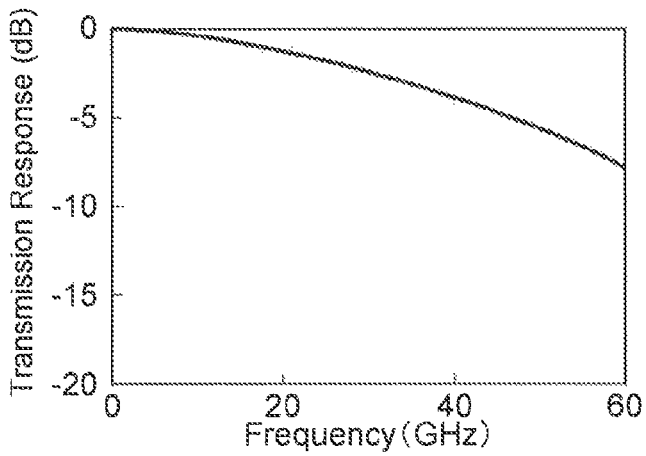

A semiconductor with a higher resistivity compared with metal is applied to the return path of the common mode. In addition, a ground line, which is composed of an outer metal and may cause an unstable potential, is not used. Therefore, in the reflection characteristics of the differential mode illustrated in FIG. 9C, the periodic drops as illustrated in FIG. 6D is avoided.

Although an example of a termination structure is illustrated in FIG. 8, a termination structure applicable to the SGS structure is not limited to this. The termination structure illustrated in FIG. 10 may be applied to the Mach-Zehnder modulator according to the present embodiment. This is an effective and simple termination structure for the Mach-Zehnder modulator according to the present embodiment. In the termination structure illustrated in FIG. 10, a thin film resistor is provided on the modulator chip for termination of the SGS structure and termination is made with the resistance for the differential mode. Therefore, termination is made without providing a resistor for the common mode. At one end of the Mach-Zehnder modulator, a transmission line in the SOS structure from a signal source is connected to a pair of arm waveguides and one ground electrode. At the other end of the Mach-Zehnder modulator, the pair of arm waveguides is connected via a termination resistor R on the modulator chip, and the other ground electrode is pulled out by a pad and connected to a ground potential via the wire WIRE. The termination resistor R is formed as a thin film resistor on a substrate for the Mach-Zehnder modulator provided as a semiconductor device. The thin film resistor may be produced, for instance, as NiCr, and may have a value of approximately 75 to 100Ω, for instance. Since the one ground electrode is provided separately from the other ground electrode, the transmission loss of the common mode may be increased. When a reflected wave generated by the termination is present, the reflected wave travels in an opposite, direction while being attenuated during its transmission from the other end to one end of the Mach-Zehnder modulator. Therefore, the amplitude of reflectance is small at the one end of the Mach-Zehnder modulator. As a result, the driver circuit operates stably without being disturbed by returning common reflected wave and degradation of the waveform of signals from the driver circuit may be reduced.

Although the principle of the present disclosure has been illustrated and described in a preferred embodiment, it should be understood by those skilled in the art that the present disclosure allows modification in arrangement and detail without departing from the principle. The present disclosure is not limited to the specific configuration disclosed in the present embodiment. Therefore, all modifications and variations coming within the spirit and scope of the appended claims are claimed.

What is claimed is:

1. A Mach-Zehnder modulator comprising:
    a conductive semiconductor region disposed on a principal surface of a substrate, the conductive semiconductor region extending in a direction of a first axis, the conductive semiconductor region having a first conductivity type;
    a first waveguide arm disposed on the conductive semiconductor region, the first waveguide arm extending in the direction of the first axis;
    a second waveguide arm disposed on the conductive semiconductor region, the second waveguide arm extending in the direction of the first axis;
    a first electrode disposed on the first waveguide arm, the first electrode receiving a first drive signal which is applied to the first waveguide arm;
    a second electrode disposed on the second waveguide arm, the second electrode receiving a second drive signal which is applied to the second waveguide arm;
    a first ground electrode disposed on the conductive semiconductor region, the first ground electrode being electrically connected to a reference potential; and
    a second ground electrode disposed on the conductive semiconductor region,
    wherein the first and second drive signals constitute a differential signal, and
    the second ground electrode is electrically connected to the first ground electrode via the conductive semiconductor region.

2. The Mach-Zehnder modulator according to claim 1, wherein the first ground electrode is separated from the second ground electrode with a first distance so as to receive a common mode noise passing from the second ground electrode via the conductive semiconductor region.

3. The Mach-Zehnder modulator according to claim 1, wherein the first electrode has a first end and a second end, the second end is separated from the first end with a second distance that is smaller than the first distance between the first ground electrode and the second ground electrode.

4. The Mach-Zehnder modulator according to claim 1, further comprising:
    a first electrode pad disposed on the principal surface of the substrate, the first drive signal being inputted to the first electrode pad from a driver circuit;
    a second electrode pad disposed on the principal surface of the substrate, the second drive signal being inputted to the second electrode pad from the driver circuit;
    a third electrode pad disposed on the principal surface of the substrate, the third electrode pad being electrically connected to the reference potential via the driver circuit;
    a first conductive line connecting the first electrode pad to the first electrode;
    a second conductive line connecting the second electrode pad to the second electrode; and
    a third conductive line connecting the third electrode pad to the first ground electrode,
    wherein the first conductive line is separated from the third conductive line,
    the second conductive line is separated from the third conductive line,
    the third conductive line is provided between the first conductive line and the second conductive line, and
    the third conductive line extends in parallel with the first and second conductive lines.

5. The Mach-Zehnder modulator according to claim 4, further comprising:
    a fourth conductive line connected to the first electrode;
    a fifth conductive line connected to the second electrode; and
    a termination resistor disposed on the principal surface of the substrate,
    wherein the termination resistor is connected to the fourth conductive line and the fifth conductive line.

6. The Mach-Zehnder modulator according to claim 1, further comprising:
    a first metal line separated from the first waveguide arm, the first metal line extending in the direction of the first axis;
    a plurality of first bridge metal bodies arranged in the direction of the first axis;
    a second metal line separated from the second waveguide arm, the second metal line extending in the direction of the first axis; and
    a plurality of second bridge metal bodies arranged in the direction of the first axis,
    wherein the first electrode includes a plurality of first electrode bodies arranged in the direction of the first axis, the second electrode includes a plurality of second electrode bodies arranged in the direction of the first axis, the plurality of first bridge metal bodies connects the first metal line to the first electrode bodies, respectively, the plurality of second bridge metal bodies connecting the second metal line to the second electrode bodies, respectively, and the first metal line, the first waveguide arm, the second waveguide arm, and the second metal line are arranged in a direction of a second axis that intersects the first axis.

7. The Mach-Zehnder modulator according to claim 6,
wherein the principal surface of the substrate has a first area, a second area, and a third area located between the first area and the second area, the third area extends in the direction of the first axis, the conductive semiconductor region has a stripe shape and extends in the direction of the first axis in the third area, the first metal line extends on the first area, and the second metal line extends on the second area.

8. The Mach-Zehnder modulator according to claim 6, further comprising:

a resin body disposed on the principal surface of the substrate and on the conductive semiconductor region, wherein the first metal line and the second metal line are disposed on the resin body.

9. The Mach-Zehnder modulator according to claim 1,
wherein the conductive semiconductor region has an edge and a first portion located between the edge and the first waveguide arm, the edge of the conductive semiconductor region extends in the direction of the first axis, and the first ground electrode is in contact with the first portion of the conductive semiconductor region.

10. The Mach-Zehnder modulator according to claim 1,
wherein the conductive semiconductor region has an edge, a first portion, and a second portion, the first portion is located between the edge and the first waveguide arm, the second portion is located between the first waveguide arm and the second waveguide arm, the edge of the conductive semiconductor region extends in the direction of the first axis, and the first ground electrode is in contact with the second portion of the conductive semiconductor region.

11. The Mach-Zehnder modulator according to claim 1,
wherein the conductive semiconductor region has an edge and a first portion located between the edge and the first waveguide arm, the edge of the conductive semiconductor region extends in the direction of the first axis, the first portion has a protruding portion protruding from the first edge, and the first ground electrode is in contact with the protruding portion of the first portion.

12. The Mach-Zehnder modulator according to claim 1,
wherein the first waveguide arm includes a first active layer disposed on the conductive semiconductor region, and a first cladding layer disposed on the first active layer, the first cladding layer has a second conductivity type, the second waveguide arm includes a second active layer disposed on the conductive semiconductor region and a second cladding layer disposed on the second active layer, the second cladding layer has the second conductivity type, the first electrode is in contact with the first cladding layer, and the second electrode is in contact with the second cladding layer.

* * * * *